Patented Dec. 26, 1922.

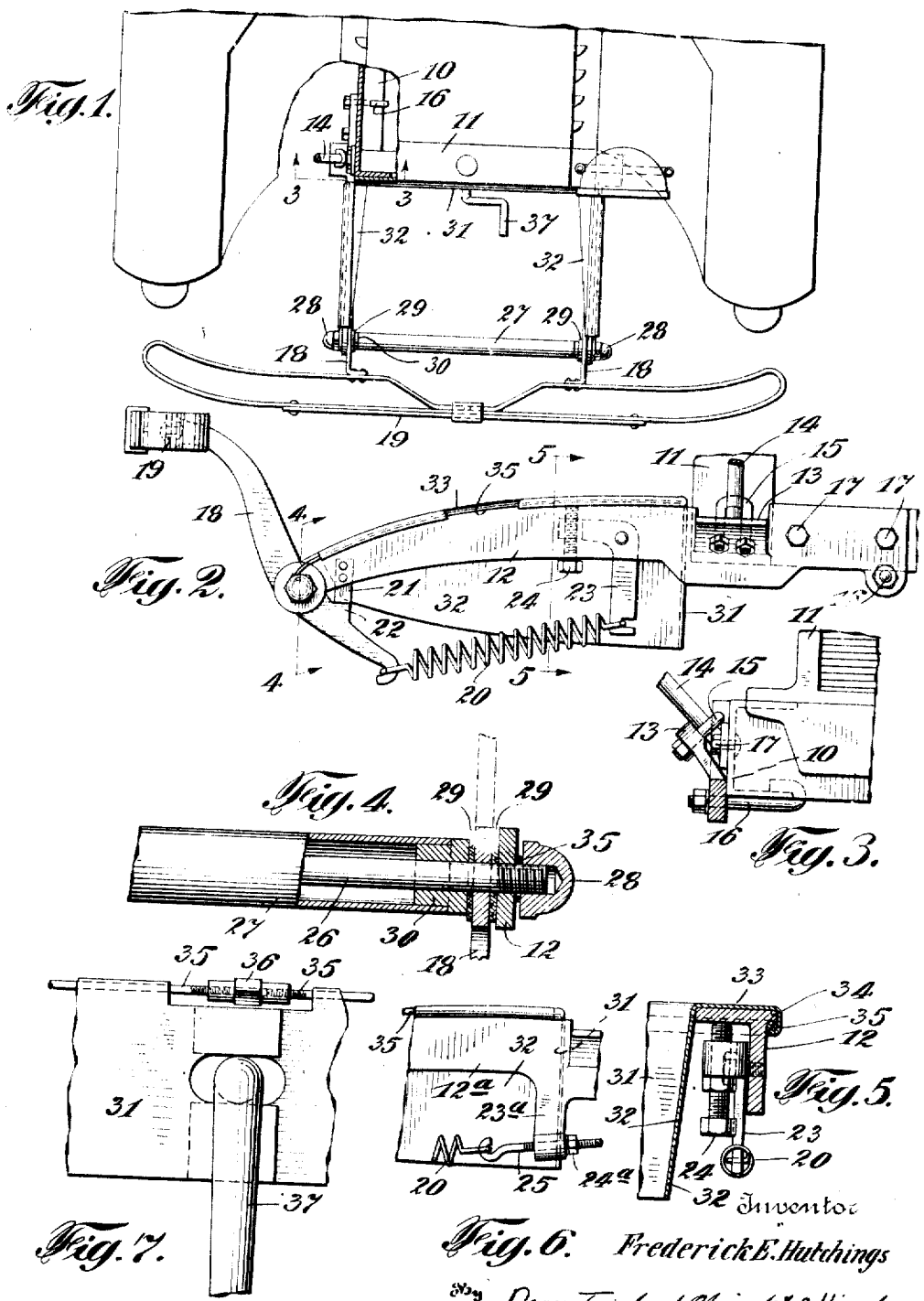

1,440,081

UNITED STATES PATENT OFFICE.

FREDERICK E. HUTCHINGS, OF BROOKLYN, NEW YORK, ASSIGNOR TO HUTCHINGS MANUFACTURING CO., INC., OF NEW YORK, N. Y., A CORPORATION OF NEW YORK.

AUTOMOBILE BUMPER.

Application filed October 11, 1922. Serial No. 593,6/o.

*To all whom it may concern:*

Be it known that I, FREDERICK E. HUTCHINGS, a citizen of the United States, and resident of Brooklyn, in the county of Kings and State of New York, have invented certain new and useful Improvements in Automobile Bumpers, of which the following is a specification.

This invention is an improvement in automobile bumpers, and relates particularly to the means for supporting the bumper bar and connecting it to the chassis or other part of the vehicle. In its preferred construction the invention is intended for use with that type of car in which there are no frame parts projecting forwardly beyond the radiator.

One of the main objects of my invention is to provide a form of support which includes members similar in appearance to the front projecting chassis parts employed in most types of automobiles.

A further object is to provide a construction of splash pan and support therefor.

A further object is to provide means whereby the bumper bar itself may move bodily rearwardly in case of collision, such movement being resisted by a yielding member independent of the bumper bar, and connected to the vehicle by the same brackets or attaching parts which carry the bumper bar.

Other objects and advantages will be pointed out hereinafter, or will be apparent from a consideration of the preferred embodiment illustrated in the accompanying drawings. In these drawings:

Fig. 1 is a top plan view, a portion being broken away.

Fig. 2 is a side elevation on a somewhat larger scale.

Fig. 3 is a transverse section on the line 3—3 of Fig. 1.

Figs. 4 and 5 are sections on the lines 4—4 and 5—5 respectively of Fig. 2.

Fig. 6 is a detail showing a slight modification, and

Fig. 7 is a front elevation of the center portion of the splash pan.

The form illustrated is particularly adapted for a Ford car in which the side members 10 of the chassis do not project forward beyond the radiator 11. In the construction illustrated I provide a pair of bars or brackets 12 which are adapted to be rigidly secured to the side members of the automobile frame, and include downwardly curved front portions corresponding in general appearance to the front portions of the chassis frame of most other types of cars. These bars or brackets 12 may be secured to the frame in any suitable manner. As illustrated, each bar has a lug or flange portion 13 set at an angle, and adapted to lie beneath the fender and lamp bracket 14 of the car, and adapted to be secured to the latter by a U-bolt 15. The rear end portions of the bars or brackets 12 may be secured by means of a hook bolt 16. If desired, both the hook-bolt and the flange portion 13 may be omitted and the bars directly secured to the frame by bolts 17. The front portion of the bars 12 may vary in cross-section, but are illustrated particularly in Fig. 5 as including side and top flange portions, and as substantially L-shape in cross section.

To the front end of each bar 12 is pivotally secured a lever 18 preferably extending in an inclined position with its upper end in advance, and adapted to swing in a vertical plane. The upper ends of the two levers 18 are connected to and serve to support the bumper bar 19. I do not wish to be limited to any particular type or construction of bumper bar, as the bar itself may vary widely within the scope of my invention.

Each lever 18 is connected at its lower rear end to a tension spring 20 which pulls rearwardly on the lower end of the lever, and holds the upper end of the lever and the bumper bar in the maximum or limiting forward position. The limit of swing may be determined by a pair of abutting shoulder portions 21 and 22 on the bar 12 and the lever 18. The spring 20 at its rear end is connected to the bar 12 so that in attaching my improved device to an automobile it is merely necessary to hold the two bars in position without attaching any other members to other parts of the vehicle. There is also preferably provided means whereby the tension of the springs may be adjusted at will. As shown in Fig. 2 a bell crank lever 23 is pivoted to each bar 12, and the lower or depending end is connected to the spring 20. The forwardly extending end is provided with an adjusting screw 24 adapted to abut against the under side of the horizontal flange portion of the bar 12, so that by turning the screw the bell crank lever may be rotated to increase or decrease the tension of the spring.

In Fig. 6 I have shown a slightly modified form in which the bar 12ª has an integral depending stud or projection 23ª through which extends a hook 25 provided with a threaded shank. By rotating the nut 24ª the tension of the spring 20 may be increased or decreased at will.

For holding the front ends of the two bars rigid in respect to each other there is provided a tie-rod 26 which also serves as the pivot rod for the levers 18. Encircling the tie-rod is a tube 27 and on the outer ends of the tie-rod are nuts 28. The bar 12 and the lever 18 are clamped between the end of the tube and the nut. To permit the free swinging of the lever there are preferably employed washers 29 on each side of the lever so that the desired amount of friction or pressure can be applied, and to form a face for the washer nearest to the end of the tube 27, the latter is provided with a plug 30 having a reduced portion fitting within the tube, and a shoulder abutting against the end of the latter. This plug also holds the tube concentric with the tie-rod.

The bars 12 are employed not only to support the bumper carrying levers 18 and the tension springs for the latter, but also serve to support a splash pan somewhat similar in general appearance to that commonly employed with many types of automobiles having forwardly projecting chassis frames or spring horns. This is illustrated as including a substantially vertical sheet metal wall 31 and forwardly extending walls 32, the latter lying along the inner sides of the bars 12 and supported by the latter. To form a frame and rigid support, and at the same time to cover and partially conceal the bars 12, the side walls 32 are shown as having flanges 33 extending across the upper surface of the bars, and depending at their outer edges to engage beneath ridges or shoulders 34 on the bars 12. Preferably these outer depending edges are reinforced by stiffening wires 35 around which the sheet metal is folded as shown particularly in Fig. 5. To hold these sheet metal walls rigidly in position, without necessitating the employment of bolts or other attaching means, the front ends of the wires 35 may be curved around the outer ends of the tie-bolts and locked in place by the nuts 28. To facilitate proper adjustment and to draw the two side walls 32 toward each other and hold the reinforcing edges in position, the front wall 31 may be made of two sections overlapping at the center, and the inforcing wire may also be made of two sections connected by a coupling 36 having right and left hand threaded connections with the sections of the wire so that they may be drawn toward each other. The two sections of the wall 31 may be slotted to leave an aperture for the engine crank 37, as shown particularly in Fig. 7.

In my improved construction it will be noted that the only parts which are directly bolted to or attached to the vehicle itself are the two bars or brackets 12, and that these may be very quickly and easily secured by the properly positioned bolts. These bars or brackets 12 carry not only the bumper bar supporting levers 18, but the connecting means for the springs 20 and the side and front wall portions of the splash pan. The springs 20 are protected beneath the brackets 12, and are partially concealed from view by the latter and by the side walls of the splash pan.

Having thus described my invention, what I claim as new and desire to secure by Letters Patent is:

1. A bumper including a pair of brackets adapted to be rigidly secured to the vehicle frame, a pair of levers pivotally secured one to each bracket, and mounted to swing in parallel vertical planes, a bumper bar secured to the upper front ends of the levers, and springs connecting the lower rear ends of the levers to the under portions of said brackets.

2. A bumper, including a pair of bars adapted to be secured to the side members of a vehicle frame and to project forwardly and downwardly therefrom in substantially parallel planes, a tie-rod connecting the front ends of said bars, a pair of levers pivotally secured to said bars at the front ends of the latter, and mounted to swing in parallel vertical planes, a bumper bar carried by the front upper ends of said levers, a depending projection carried by each bar of said pair, and a coil spring connecting each projection to the lower rear end of its corresponding lever.

3. A bumper, including a pair of bars adapted to be secured to the side members of a vehicle frame and to project forwardly and downwardly therefrom in substantially parallel planes, a tie-rod connecting the front ends of said bars, a pair of levers pivotally secured to said bars at the front ends of the latter, and mounted to swing in parallel vertical planes, a bumper bar carried by the front upper ends of said levers, a projection carried by each bar of said pair, a coil spring connecting each projection to the lower rear end of its corresponding lever, and means for adjusting the tension of the spring.

4. A bumper including a pair of bars adapted to be rigidly secured to the side members of a vehicle frame and having forwardly and downwardly curved portions, a lever pivotally connected to the front end of each of said bars, a coil spring connecting the lower end of each lever to the under rear portion of its corresponding bar, and a sheet metal plate carried by each bar and depending therefrom along the inner surface thereof.

5. A bumper including a pair of bars adapted to be rigidly secured to the side members of a vehicle frame and having forwardly and downwardly curved portions, a lever pivotally connected to the front end of each of said bars, yielding means engaging the lower ends of said levers for resisting swinging movement of the latter, and a splash pan including a transversely extending substantially vertical wall portion, the latter lying along the inner sides of said bars and supported by said bars.

6. A bumper including a pair of bars adapted to be rigidly secured to the side members of a vehicle frame and having forwardly and downwardly curved portions, a lever pivotally connected to the front end of each of said bars, yielding means engaging the lower ends of said levers for resisting swinging movement of the latter, and depending sheet metal wall portions secured to said bars and partially concealing said yielding means.

7. A bumper including a pair of bars adapted to be rigidly secured to the side members of a vehicle frame and having forwardly and downwardly curved portions, a lever pivotally connected to the front end of each of said bars, yielding means engaging the lower ends of said levers for resisting swinging movement of the latter, and a sheet metal splash pan having a transverse substantially vertical portion between said bars and forwardly extending substantially vertical portions adjacent to the inner sides of said bars, the upper edges of said last mentioned portions extending across the upper sides of said bars.

8. A vehicle bumper including a pair of bars adapted to be rigidly secured to the side members of the frame of the vehicle, and having forwardly and downwardly extending front bars, a bumper bar, means for supporting the latter from the front portions of said bars, and a splash pan including a substantially vertical portion extending transversely between said bars, and substantially vertical forwardly extending portions along the sides of said bars and supported by the latter.

9. A vehicle bumper including a pair of bars adapted to be rigidly secured to the side members of the frame of the vehicle, and having forwardly and downwardly extending front bars, a bumper bar, means for supporting the latter from the front portions of said bars, a splash pan including a substantially vertical portion extending transversely between said bars, and substantially vertical forwardly extending portions along the sides of said bars and supported by the latter, said forwardly extending portions having reinforced edges engaging with the outer sides of the bars.

10. A vehicle bumper, including a pair of bars adapted to be rigidly secured to the vehicle, a bumper bar carried by said bars at the front ends of the latter, and a splash pan also carried by said bars and including depending wall portions along the inner sides of the bars and a transverse wall portion between said bars.

11. A bumper including a pair of bars adapted to be secured to a vehicle frame and project forwardly therefrom in substantially parallel planes, a tie rod connecting the front ends of said bars, a pair of levers pivotally mounted on said tie rod adjacent to said bars, a bumper bar carried by the upper ends of said levers and springs connecting the lower ends of said levers to the under portion of said first mentioned bars.

12. A bumper including a pair of bars adapted to be secured to a vehicle frame and project forwardly therefrom in substantially parallel planes, a tie rod connecting the front ends of said bars, a pair of levers pivotally mounted on said tie rod, a bumper bar carried by the upper ends of said levers, friction means for resisting swinging movement of said levers in respect to said first mentioned parts, and separate yielding means engaging with said levers for resisting swinging movement of the latter.

Signed at New York, in the county of New York and State of New York, this 9th day of October, A. D. 1922.

FREDERICK E. HUTCHINGS.